(12) United States Patent
Wu et al.

(10) Patent No.: US 9,792,873 B2
(45) Date of Patent: Oct. 17, 2017

(54) LIQUID CRYSTAL DISPLAY PANEL AND LIQUID CRYSTAL DISPLAY DEVICE WITH LOW MANUFACTURING COST

(71) Applicant: Shenzhen China Star Optoelectronics Technology Co., Ltd., Guangdong (CN)

(72) Inventors: Jingjing Wu, Shenzhen (CN); Dongsheng Guo, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 242 days.

(21) Appl. No.: 14/650,313

(22) PCT Filed: Apr. 16, 2015

(86) PCT No.: PCT/CN2015/076701
§ 371 (c)(1),
(2) Date: Jun. 8, 2015

(87) PCT Pub. No.: WO2016/155039
PCT Pub. Date: Oct. 6, 2016

(65) Prior Publication Data
US 2016/0372073 A1     Dec. 22, 2016

(30) Foreign Application Priority Data

Mar. 30, 2015 (CN) .......................... 2015 1 0145895

(51) Int. Cl.
*G09G 3/36* (2006.01)
*G02F 1/133* (2006.01)
*G02F 1/1362* (2006.01)
*G02F 1/1368* (2006.01)

(52) U.S. Cl.
CPC ........... *G09G 3/3696* (2013.01); *G02F 1/133* (2013.01); *G02F 1/1368* (2013.01); *G02F 1/136286* (2013.01); *G09G 3/3677* (2013.01); *G09G 3/3688* (2013.01); *G09G 2310/0289* (2013.01); *G09G 2310/0291* (2013.01)

(58) Field of Classification Search
CPC .. G02F 1/136286; G02F 1/1368; G02F 1/133; G09G 3/3677
USPC ......................................................... 345/87
See application file for complete search history.

(56) References Cited

U.S. PATENT DOCUMENTS

| | | | |
|---|---|---|---|
| 2003/0025127 A1* | 2/2003 | Yanai | H01L 27/12 257/158 |
| 2003/0201959 A1* | 10/2003 | Sakaguchi | G09G 3/3696 345/87 |
| 2008/0309655 A1* | 12/2008 | Ito | H02M 3/07 345/211 |

(Continued)

*Primary Examiner* — Jonathan Blancha

(57) ABSTRACT

The present invention provides a liquid crystal display panel. The liquid crystal display panel includes drive circuits, data lines for transmitting the data signals, scan lines, and pixel units. Each of the drive circuits includes a level shifter and an output buffer. Voltage signals which are inputted to a non-inverting input terminal and an inverting input terminal of the level shifter are determined according to a number of inverting amplifiers of the output buffer. The present invention further provides a liquid crystal display device. The present invention can effectively decrease the manufacture cost of the liquid crystal display panel.

16 Claims, 4 Drawing Sheets

(56) References Cited

U.S. PATENT DOCUMENTS

2010/0182307 A1* 7/2010 Chang .................. G09G 3/3688
  345/214
2013/0162294 A1* 6/2013 Henmi ........... H03K 19/018507
  326/80

* cited by examiner

LIQUID CRYSTAL DISPLAY PANEL AND
LIQUID CRYSTAL DISPLAY DEVICE WITH
LOW MANUFACTURING COST

RELATED APPLICATIONS

This application is a National Phase of PCT Patent Application No. PCT/CN2015/076701 having International filing date of Apr. 16, 2015, which claims the benefit of priority of Chinese Patent Application No. 201510145895.2 filed on Mar. 30, 2015. The contents of the above applications are all incorporated by reference as if fully set forth herein in their entirety.

BACKGROUND OF THE INVENTION

1. Field of the Invention

The present invention generally relates to a display field, and more particularly to a liquid crystal display panel and a liquid crystal display device.

2. Description of Prior Art

With the development of techniques, a user's demand for a high definition display device having a large screen is significantly increasing. A market demand for liquid crystal display devices is getting higher and higher. Meanwhile, the techniques of liquid crystal display panels become more and more mature. On the basis of guaranteeing quality of a liquid crystal display panel, decreasing the cost of the liquid crystal display panel is a research direction for manufacturers of the display panels.

A drive chip for scan lines in a conventional liquid crystal display panel outputs scan signals via a level shifter and an output buffer. The level shifter is utilized for converting an input voltage signal into a high level or a low level signal. The output buffer comprises plural stages of inverting amplifiers. Each of the stages of the inverting amplifiers inversely amplifies the high level or the low level signal, such that the drive chip finally outputs the scan signals with sufficient drive ability.

However, when the inverting amplifiers amplify the high level or the low level signal, inverse operations are performed to the high level or the low level signal. To ensure the accuracy of the outputted scanning signals, the output buffer should comprise an even number of the inverting amplifiers disposed therein, so as to amplify the high level or the low level signal an even number of times. Since the inverting amplifiers require an even number, the manufacture cost of the liquid crystal display panel is probably increased.

Consequently, there is a need to provide a liquid crystal display panel and a liquid crystal display device for solving the above-mentioned problem in the prior art.

SUMMARY OF THE INVENTION

An objective of the present invention is to provide a liquid crystal display panel and a liquid crystal display device in which voltage signals which are inputted to a non-inverting input terminal and an inverting input terminal of a level shifter are determined according to a number of inverting amplifiers of an output buffer. The manufacture cost of the liquid crystal display panel can be effectively decreased, thereby solving the technical problem that the manufacture costs of the liquid crystal display panel and the liquid crystal display device are high in the prior art.

To solve the above-mentioned problems, a technical scheme of the present invention is described as follows. The present invention provides a liquid crystal display panel. The liquid crystal display panel comprises: drive circuits for providing data signals and scan signals; data lines for transmitting the data signals; scan lines for transmitting the scan signals; and pixel units for using the data signals to display an image under control of the scan signals. Each of the drive circuits comprises: a level shifter for converting an input voltage signal into a high level signal or a low level signal, and the level shifter comprising a non-inverting terminal, an inverting terminal, and a level signal output terminal; and an output buffer for amplifying the high level signal or the low level signal, and the output buffer comprising a plurality of inverting amplifiers. Voltage signals which are inputted to the non-inverting input terminal and the inverting input terminal of the level shifter are determined according to a number of the inverting amplifiers of the output buffer.

In the liquid crystal display panel of the present invention, when the output buffer comprises an even number of the inverting amplifiers, a non-inverting voltage signal is inputted to the non-inverting input terminal of the level shifter and an inverting voltage signal is inputted to the inverting input terminal of the level shifter.

In the liquid crystal display panel of the present invention, when the output buffer comprises an odd number of the inverting amplifiers, an inverting voltage signal is inputted to the non-inverting input terminal of the level shifter and a non-inverting voltage signal is inputted to the inverting input terminal of the level shifter.

In the liquid crystal display panel of the present invention, the inverting voltage signal is generated after the non-inverting voltage signal passes through a NOT gate.

In the liquid crystal display panel of the present invention, the level shifter comprises a first switching transistor, a second switching transistor, a third switching transistor, a fourth switching transistor, a fifth switching transistor, a sixth switching transistor, a seventh switching transistor, and an eighth switching transistor. A control terminal of the first switching transistor is coupled to the non-inverting input terminal. An input terminal of the first switching transistor is coupled to the low level signal. An output terminal of the first switching transistor is coupled to a control terminal of the eighth switching transistor, an output terminal of the third switching transistor, and a control terminal of the fourth switching transistor. A control terminal of the second switching transistor is coupled to the inverting input terminal. An input terminal of the second switching transistor is coupled to the low level signal. An output terminal of the second switching transistor is coupled to a control terminal of the third switching transistor, an output terminal of the fourth switching transistor, and a control terminal of the seventh switching transistor. An input terminal of the third switching transistor is coupled to the high level signal. An input terminal of the fourth switching transistor is coupled to the high level signal. An input terminal of the fifth switching transistor is coupled to the low level signal. A control terminal of the fifth switching transistor is coupled to the level signal output terminal. An output terminal of the fifth switching transistor is coupled to an output terminal of the seventh switching transistor and a control terminal of the sixth switching transistor. An input terminal of the sixth switching transistor is coupled to the low level signal. An output terminal of the sixth switching transistor is coupled to the level signal output terminal. An input terminal of the seventh switching transistor is coupled to the high level signal. An input terminal of the eighth switching transistor is coupled to the high level signal. An output terminal of the eighth switching transistor is coupled to the level signal output terminal.

In the liquid crystal display panel of the present invention, the first switching transistor, the second switching transistor, the fifth switching transistor, and the sixth switching transistor are n-channel metal-oxide-semiconductor field-effect transistors.

In the liquid crystal display panel of the present invention, the third switching transistor, the fourth switching transistor, the seventh switching transistor, and the eighth switching transistor are p-channel metal-oxide-semiconductor field-effect transistors.

The present invention further provides a liquid crystal display device. The liquid crystal display device comprises a liquid crystal display panel and a backlight source. The liquid crystal display panel comprises: drive circuits for providing data signals and scan signals; data lines for transmitting the data signals; scan lines for transmitting the scan signals; and pixel units for using the data signals to display an image under control of the scan signals. Each of the drive circuits comprises: a level shifter for converting an input voltage signal into a high level signal or a low level signal, and the level shifter comprising a non-inverting terminal, an inverting terminal, and a level signal output terminal; and an output buffer for amplifying the high level signal or the low level signal, and the output buffer comprising a plurality of inverting amplifiers. Voltage signals which are inputted to the non-inverting input terminal and the inverting input terminal of the level shifter are determined according to a number of the inverting amplifiers of the output buffer.

In the liquid crystal display device of the present invention, when the output buffer comprises an even number of the inverting amplifiers, a non-inverting voltage signal is inputted to the non-inverting input terminal of the level shifter and an inverting voltage signal is inputted to the inverting input terminal of the level shifter.

In the liquid crystal display device of the present invention, when the output buffer comprises an odd number of the inverting amplifiers, an inverting voltage signal is inputted to the non-inverting input terminal of the level shifter and a non-inverting voltage signal is inputted to the inverting input terminal of the level shifter.

In the liquid crystal display device of the present invention, the inverting voltage signal is generated after the non-inverting voltage signal passes through a NOT gate.

In the liquid crystal display device of the present invention, the level shifter comprises a first switching transistor, a second switching transistor, a third switching transistor, a fourth switching transistor, a fifth switching transistor, a sixth switching transistor, a seventh switching transistor, and an eighth switching transistor. A control terminal of the first switching transistor is coupled to the non-inverting input terminal. An input terminal of the first switching transistor is coupled to the low level signal. An output terminal of the first switching transistor is coupled to a control terminal of the eighth switching transistor, an output terminal of the third switching transistor, and a control terminal of the fourth switching transistor. A control terminal of the second switching transistor is coupled to the inverting input terminal. An input terminal of the second switching transistor is coupled to the low level signal. An output terminal of the second switching transistor is coupled to a control terminal of the third switching transistor, an output terminal of the fourth switching transistor, and a control terminal of the seventh switching transistor. An input terminal of the third switching transistor is coupled to the high level signal. An input terminal of the fourth switching transistor is coupled to the high level signal. An input terminal of the fifth switching transistor is coupled to the low level signal. A control terminal of the fifth switching transistor is coupled to the level signal output terminal. An output terminal of the fifth switching transistor is coupled to an output terminal of the seventh switching transistor and a control terminal of the sixth switching transistor. An input terminal of the sixth switching transistor is coupled to the low level signal. An output terminal of the sixth switching transistor is coupled to the level signal output terminal. An input terminal of the seventh switching transistor is coupled to the high level signal. An input terminal of the eighth switching transistor is coupled to the high level signal. An output terminal of the eighth switching transistor is coupled to the level signal output terminal.

In the liquid crystal display device of the present invention, the first switching transistor, the second switching transistor, the fifth switching transistor, and the sixth switching transistor are n-channel metal-oxide-semiconductor field-effect transistors.

In the liquid crystal display device of the present invention, the third switching transistor, the fourth switching transistor, the seventh switching transistor, and the eighth switching transistor are p-channel metal-oxide-semiconductor field-effect transistors.

Compared with the liquid crystal display panel and the liquid crystal display device in the prior art, the input voltage signals of the non-inverting terminal and the inverting terminal of the level shifter are determined according to the number of the inverting amplifiers of the output buffer in the liquid crystal display panel and the liquid crystal display device of the present invention. The manufacture cost of the liquid crystal display panel can be effectively decreased, thereby solving the technical problem that the manufacture costs of the liquid crystal display panel and the liquid crystal display device are high in the prior art.

For a better understanding of the aforementioned content of the present invention, preferable embodiments are illustrated in accordance with the attached figures for further explanation:

DETAILED DESCRIPTION OF THE INVENTION

Figure 1:
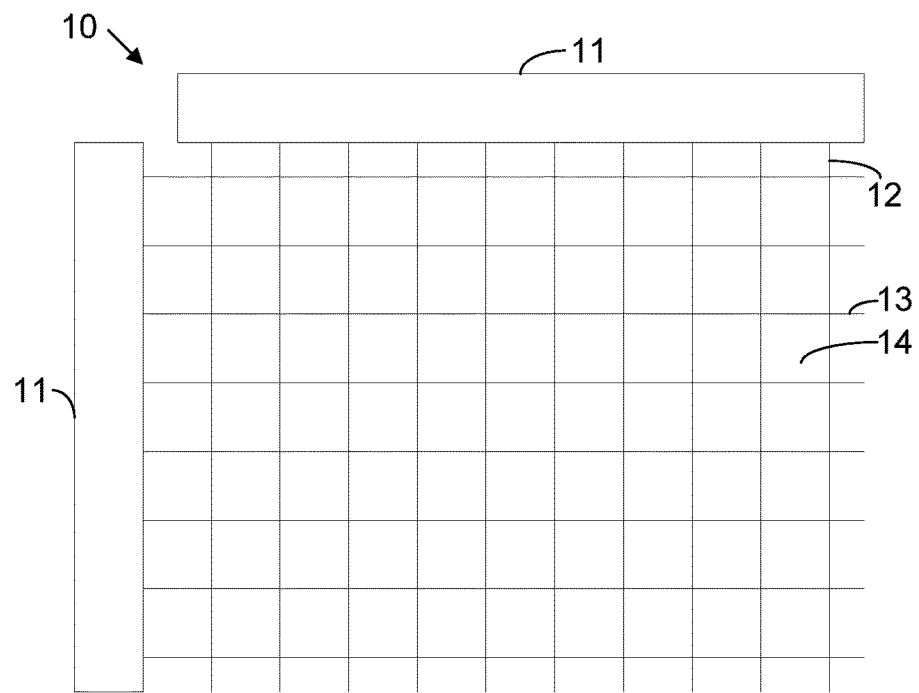
FIG. 1 shows a structural diagram of a liquid crystal display panel in accordance with a preferred embodiment of the present invention.

The following embodiments are referring to the accompanying drawings for exemplifying specific implementable embodiments of the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

In the drawings, structure-like elements are labeled with like reference numerals.

Please refer to FIG. 1. FIG. 1 shows a structural diagram of a liquid crystal display panel in accordance with a preferred embodiment of the present invention. The liquid crystal display panel 10 of the present preferred embodiment comprises drive circuits 11, data lines 12, scan lines 13, and pixel units 14. The drive circuits 11 are utilized for providing data signals and scan signals. The data lines 12 are utilized for transmitting the data signals. The scan lines 13 are utilized for transmitting the scan signals. The pixel units 14 are utilized for using the data signals to display an image under control of the scan signals.

Figure 2A:
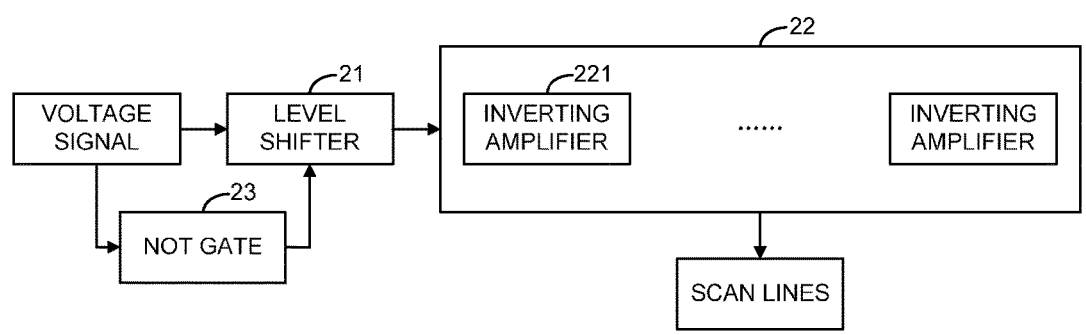
FIG. 2A shows a structural diagram of each of drive circuits in the liquid crystal display panel of the present invention in accordance with a first preferred embodiment.
Figure 2B:
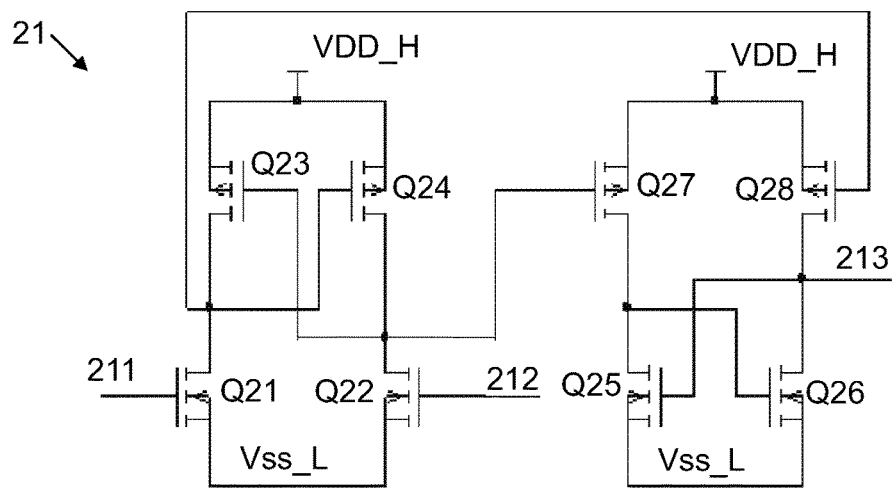
FIG. 2B shows a structural diagram of a level shifter of each of the drive circuits in the liquid crystal display panel of the present invention in accordance with a first preferred embodiment.
Figure 2C:
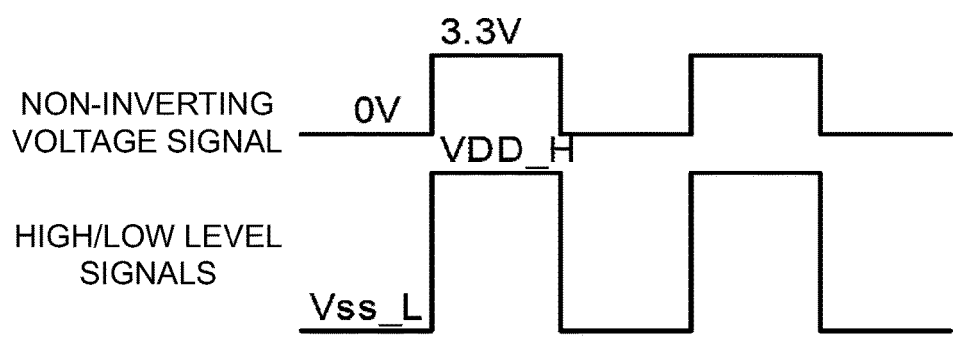
FIG. 2C shows an input signal and an output signal of the level shifter of each of the drive circuits in the liquid crystal display panel of the present invention in accordance with a first preferred embodiment.

Please refer to FIG. 2A to FIG. 2C. FIG. 2A shows a structural diagram of each of the drive circuits in the liquid crystal display panel of the present invention in accordance with a first preferred embodiment. FIG. 2B shows a structural diagram of a level shifter of each of the drive circuits in the liquid crystal display panel of the present invention in accordance with a first preferred embodiment. FIG. 2C shows an input signal and an output signal of the level shifter of each of the drive circuits in the liquid crystal display panel of the present invention in accordance with a first preferred embodiment.

In the present preferred embodiment, the drive circuit of the liquid crystal display panel comprises the level shifter 21 and an output buffer 22. The level shifter 21 is utilized for converting an input voltage signal into a high level signal or a low level signal. The level shifter 21 comprises a non-inverting terminal 211, an inverting terminal 212, and a level signal output terminal 213. The output buffer 22 is utilized for amplifying the high level signal or the low level signal. The output buffer 22 comprises a plurality of inverting amplifiers 221. Input voltage signals of the non-inverting input terminal 211 and the inverting input terminal 212 of the level shifter 21 are determined according to a number of the inverting amplifiers 221 of the output buffer 22.

In the present preferred embodiment, the output buffer 22 comprises an even number of the inverting amplifiers 221, for example, two inverting amplifiers 221 or four inverting amplifiers 221. That is, drive power of the scan signals of the scan lines is achieved by utilizing the even number of the inverting amplifiers 221. A non-inverting voltage signal is inputted to the non-inverting input terminal 211 of the level shifter 21, and an inverting voltage signal is inputted to the inverting input terminal 212 of the level shifter 21. The inverting voltage signal is generated after the non-inverting voltage signal passes through a NOT gate 23.

As shown in FIG. 2B, the level shifter 21 comprises a first switching transistor Q21, a second switching transistor Q22, a third switching transistor Q23, a fourth switching transistor Q24, a fifth switching transistor Q25, a sixth switching transistor Q26, a seventh switching transistor Q27, and an eighth switching transistor Q28. The first switching transistor Q21, the second switching transistor Q22, the fifth switching transistor Q25, and the sixth switching transistor Q26 are n-channel metal-oxide-semiconductor field-effect transistors. The third switching transistor Q23, the fourth switching transistor Q24, the seventh switching transistor Q27, and the eighth switching transistor Q28 are p-channel metal-oxide-semiconductor field-effect transistors.

A control terminal of the first switching transistor Q21 is coupled to the non-inverting input terminal 211. An input terminal of the first switching transistor Q21 is coupled to the low level signal Vss_L. An output terminal of the first switching transistor Q21 is coupled to a control terminal of the eighth switching transistor Q28, an output terminal of the third switching transistor Q23, and a control terminal of the fourth switching transistor Q24.

A control terminal of the second switching transistor Q22 is coupled to the inverting input terminal 212. An input terminal of the second switching transistor Q22 is coupled to the low level signal Vss_L. An output terminal of the second switching transistor Q22 is coupled to a control terminal of the third switching transistor Q23, an output terminal of the fourth switching transistor Q24, and a control terminal of the seventh switching transistor Q27.

An input terminal of the third switching transistor Q23 is coupled to the high level signal VDD_H. An input terminal of the fourth switching transistor Q24 is coupled to the high level signal VDD_H.

An input terminal of the fifth switching transistor Q25 is coupled to the low level signal Vss_L. A control terminal of the fifth switching transistor Q25 is coupled to the level signal output terminal 213. An output terminal of the fifth switching transistor Q25 is coupled to an output terminal of the seventh switching transistor Q27 and a control terminal of the sixth switching transistor Q26.

An input terminal of the sixth switching transistor Q26 is coupled to the low level signal Vss_L. An output terminal of the sixth switching transistor Q26 is coupled to the level signal output terminal 213.

An input terminal of the seventh switching transistor Q27 is coupled to the high level signal VDD_H. An input terminal of the eighth switching transistor Q28 is coupled to the high level signal VDD_H. An output terminal of the eighth switching transistor Q28 is coupled to the level signal output terminal 213.

The non-inverting voltage signal is inputted to the non-inverting input terminal 211 of the level shifter 21. The inverting voltage signal is inputted to the inverting input terminal 212 of the level shifter 21. When the non-inverting voltage signal is a high voltage signal and the inverting voltage signal is a low voltage signal, the first switching transistor Q21 is turned on and the second switching transistor Q22 is turned off. The fourth switching transistor Q24 and the eighth switching transistor Q28 are turned on. The third switching transistor Q23 and the seventh switching transistor Q27 are turned off. The fifth switching transistor Q25 is turned on. The sixth switching transistor Q26 is turned off. The high level signal VDD_H is outputted to the level signal output terminal 213 via the eighth switching transistor Q28.

When the non-inverting voltage signal is a low voltage signal and the inverting voltage signal is a high voltage signal, the second switching transistor Q22 is turned on and the first switching transistor Q21 is turned off. The third switching transistor Q23 and the seventh switching transistor Q27 are turned on. The fourth switching transistor Q24 and the eighth switching transistor Q28 are turned off. The sixth switching transistor Q26 is turned on. The fifth switching transistor Q25 is turned off. The low level signal Vss_L is outputted to the level signal output terminal 213 via the sixth switching transistor Q26.

Accordingly, as shown in FIG. 2C, phases of the high level signal and the low level signal which are outputted by the level signal output terminal 213 are the same as phases of the non-inverting voltage signal. The high level signal and the low level signal which are outputted by the level shifter 21 are amplified by the even number of the inverting amplifiers 221 of the output buffer 22 and then outputted to corresponding scan lines. Since the inverting operations are performed an even number of times, phases of the scan signals which are outputted to the scan lines are the same as the phases of the non-inverting voltage signal.

Figure 3A:
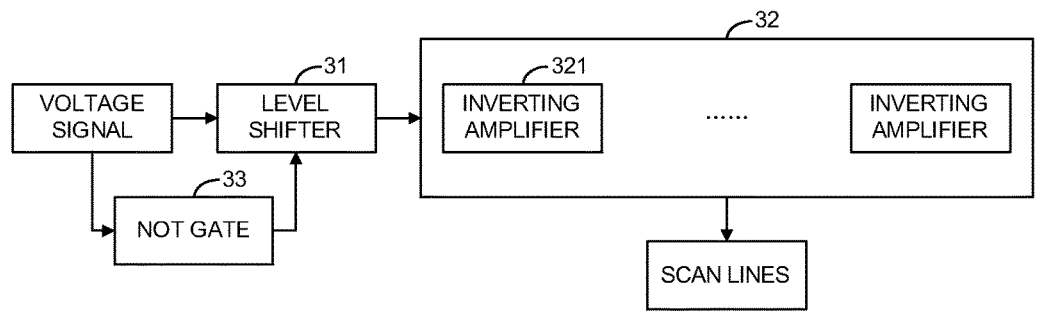
FIG. 3A shows a structural diagram of each of the drive circuits in the liquid crystal display panel of the present invention in accordance with a second preferred embodiment.
Figure 3B:
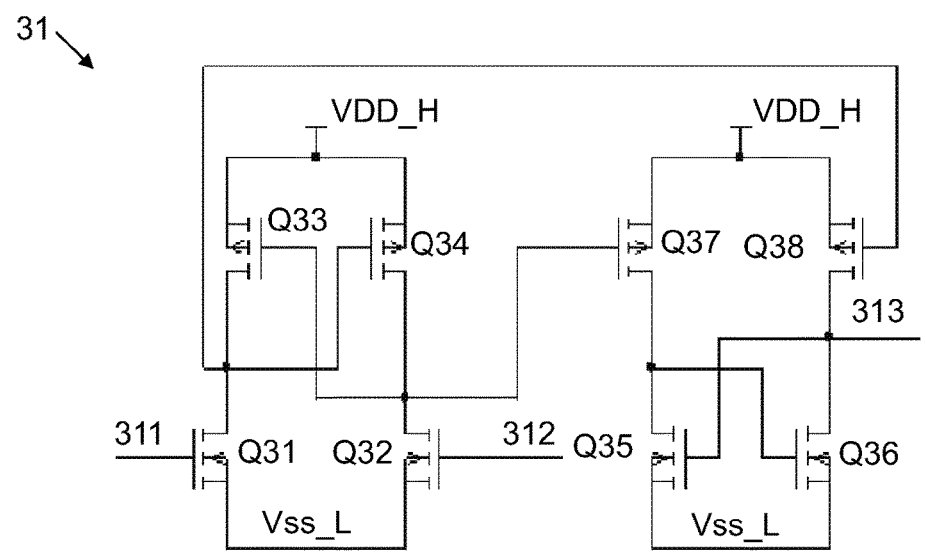
FIG. 3B shows a structural diagram of a level shifter of each of the drive circuits in the liquid crystal display panel of the present invention in accordance with a second preferred embodiment.
Figure 3C:
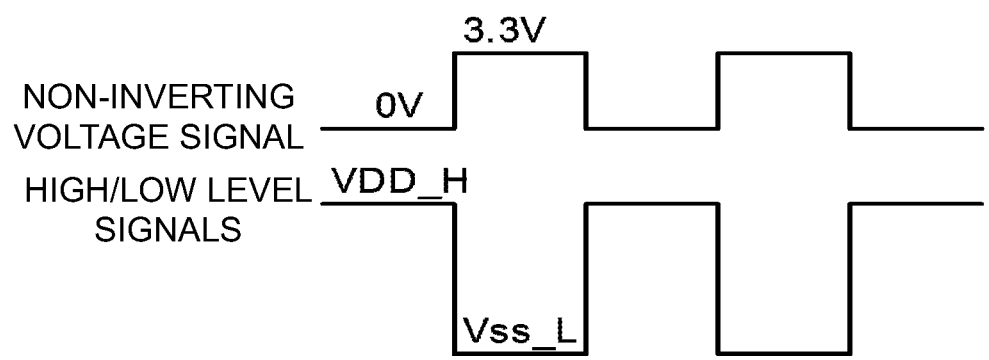
FIG. 3C shows an input signal and an output signal of the level shifter of each of the drive circuits in the liquid crystal display panel of the present invention in accordance with a second preferred embodiment.

Please refer to FIG. 3A to FIG. 3C. FIG. 3A shows a structural diagram of each of the drive circuits in the liquid crystal display panel of the present invention in accordance with a second preferred embodiment. FIG. 3B shows a structural diagram of a level shifter of each of the drive circuits in the liquid crystal display panel of the present invention in accordance with a second preferred embodiment. FIG. 3C shows an input signal and an output signal of the level shifter of each of the drive circuits in the liquid crystal display panel of the present invention in accordance with a second preferred embodiment.

In the present preferred embodiment, the drive circuit of the liquid crystal display panel comprises the level shifter 31 and an output buffer 32. The level shifter 31 is utilized for converting an input voltage signal into a high level signal or a low level signal. The level shifter 31 comprises a non-inverting terminal 311, an inverting terminal 312, and a level signal output terminal 313. The output buffer 32 is utilized for amplifying the high level signal or the low level signal. The output buffer 32 comprises a plurality of inverting amplifiers 321. Input voltage signals of the non-inverting input terminal 311 and the inverting input terminal 312 of the level shifter 31 are determined according to a number of the inverting amplifiers 321 of the output buffer 32.

In the present preferred embodiment, the output buffer 32 comprises an odd number of the inverting amplifiers 321, for example, three inverting amplifiers 321 or five inverting amplifiers 321. That is, drive power of the scan signals of the scan lines is achieved by utilizing the odd number of the inverting amplifiers 321. An inverting voltage signal is inputted to the non-inverting input terminal 311 of the level shifter 31, and a non-inverting voltage signal is inputted to the inverting input terminal 312 of the level shifter 31. The inverting voltage signal is generated after the non-inverting voltage signal passes through a NOT gate 33.

As shown in FIG. 3B, the level shifter 31 comprises a first switching transistor Q31, a second switching transistor Q32, a third switching transistor Q33, a fourth switching transistor Q34, a fifth switching transistor Q35, a sixth switching transistor Q36, a seventh switching transistor Q37, and an eighth switching transistor Q38. The first switching transistor Q31, the second switching transistor Q32, the fifth switching transistor Q35, and the sixth switching transistor Q36 are n-channel metal-oxide-semiconductor field-effect transistors. The third switching transistor Q33, the fourth switching transistor Q34, the seventh switching transistor Q37, and the eighth switching transistor Q38 are p-channel metal-oxide-semiconductor field-effect transistors.

A control terminal of the first switching transistor Q31 is coupled to the non-inverting input terminal 311. An input terminal of the first switching transistor Q31 is coupled to the low level signal Vss_L. An output terminal of the first switching transistor Q31 is coupled to a control terminal of the eighth switching transistor Q38, an output terminal of the third switching transistor Q33, and a control terminal of the fourth switching transistor Q34.

A control terminal of the second switching transistor Q32 is coupled to the inverting input terminal 312. An input terminal of the second switching transistor Q32 is coupled to the low level signal Vss_L. An output terminal of the second switching transistor Q32 is coupled to a control terminal of the third switching transistor Q33, an output terminal of the fourth switching transistor Q34, and a control terminal of the seventh switching transistor Q37.

An input terminal of the third switching transistor Q33 is coupled to the high level signal VDD_H. An input terminal of the fourth switching transistor Q34 is coupled to the high level signal VDD_H.

An input terminal of the fifth switching transistor Q35 is coupled to the low level signal Vss_L. A control terminal of the fifth switching transistor Q35 is coupled to the level signal output terminal 313. An output terminal of the fifth switching transistor Q35 is coupled to an output terminal of the seventh switching transistor Q37 and a control terminal of the sixth switching transistor Q36.

An input terminal of the sixth switching transistor Q36 is coupled to the low level signal Vss_L. An output terminal of the sixth switching transistor Q36 is coupled to the level signal output terminal 313.

An input terminal of the seventh switching transistor Q37 is coupled to the high level signal VDD_H. An input terminal of the eighth switching transistor Q38 is coupled to the high level signal VDD_H. An output terminal of the eighth switching transistor Q38 is coupled to the level signal output terminal 313.

The inverting voltage signal is inputted to the non-inverting input terminal 311 of the level shifter 31. The non-inverting voltage signal is inputted to the inverting input terminal 312 of the level shifter 31. When the non-inverting voltage signal is a low voltage signal and the inverting voltage signal is a high voltage signal, the first switching transistor Q31 is turned on and the second switching transistor Q32 is turned off. The fourth switching transistor Q34 and the eighth switching transistor Q38 are turned on. The third switching transistor Q33 and the seventh switching transistor Q37 are turned off. The fifth switching transistor Q35 is turned on. The sixth switching transistor Q36 is turned off. The high level signal VDD_H is outputted to the level signal output terminal 313 via the eighth switching transistor Q38.

When the non-inverting voltage signal is a high voltage signal and the inverting voltage signal is a low voltage signal, the second switching transistor Q32 is turned on and the first switching transistor Q31 is turned off. The third switching transistor Q33 and the seventh switching transistor Q37 are turned on. The fourth switching transistor Q34 and the eighth switching transistor Q38 are turned off. The sixth switching transistor Q36 is turned on. The fifth switching transistor Q35 is turned off. The low level signal Vss_L is outputted to the level signal output terminal 313 via the sixth switching transistor Q36.

Accordingly, as shown in FIG. 3C, phases of the high level signal and the low level signal which are outputted by the level signal output terminal 313 are opposite to phases of the non-inverting voltage signal. The high level signal and the low level signal which are outputted by the level shifter 31 are amplified by the odd number of the inverting amplifiers 321 of the output buffer 32 and then outputted to corresponding scan lines. Since the inverting operations are performed an odd number of times, phases of the scan signals which are outputted to the scan lines are the same as the phases of the non-inverting voltage signal.

In the liquid crystal display panel of the present invention, the input voltage signals of the non-inverting terminal and the inverting terminal of the level shifter are determined according to a number of the inverting amplifiers of the output buffer. A suitable number of the inverting amplifiers can be utilized for performing the signal amplifying process. It is not necessary to fixedly dispose an even number of the inverting amplifiers to ensure the accuracy of the phases of the scan signals. Accordingly, the manufacture cost of the liquid crystal display panel can be effectively decreased.

The present invention further provides a liquid crystal display device. The liquid crystal display device comprises a backlight source and a liquid crystal display panel. Each of drive circuits of the liquid crystal display panel comprises a level shifter and an output buffer. The level shifter is utilized for converting an input voltage signal into a high level signal or a low level signal. The level shifter comprises a non-inverting terminal, an inverting terminal, and a level signal output terminal. The output buffer is utilized for amplifying the high level signal or the low level signal. The output buffer comprises a plurality of inverting amplifiers. Input voltage signals of the non-inverting input terminal and the inverting input terminal of the level shifter are determined according to a number of the inverting amplifiers of the output buffer.

Preferably, when the output buffer comprises an even number of the inverting amplifiers, a non-inverting voltage signal is inputted to the non-inverting input terminal of the level shifter and an inverting voltage signal is inputted to the inverting input terminal of the level shifter. When the output buffer comprises an odd number of the inverting amplifiers, an inverting voltage signal is inputted to the non-inverting input terminal of the level shifter and a non-inverting voltage signal is inputted to the inverting input terminal of the level shifter. The inverting voltage signal is generated after the non-inverting voltage signal passes through a NOT gate.

Preferably, the level shifter comprises a first switching transistor, a second switching transistor, a third switching transistor, a fourth switching transistor, a fifth switching transistor, a sixth switching transistor, a seventh switching transistor, and an eighth switching transistor.

A control terminal of the first switching transistor is coupled to the non-inverting input terminal. An input terminal of the first switching transistor is coupled to the low level signal. An output terminal of the first switching transistor is coupled to a control terminal of the eighth switching transistor, an output terminal of the third switching transistor, and a control terminal of the fourth switching transistor.

A control terminal of the second switching transistor is coupled to the inverting input terminal. An input terminal of the second switching transistor is coupled to the low level signal. An output terminal of the second switching transistor is coupled to a control terminal of the third switching transistor, an output terminal of the fourth switching transistor, and a control terminal of the seventh switching transistor.

An input terminal of the third switching transistor is coupled to the high level signal. An input terminal of the fourth switching transistor is coupled to the high level signal.

An input terminal of the fifth switching transistor is coupled to the low level signal. A control terminal of the fifth switching transistor is coupled to the level signal output terminal. An output terminal of the fifth switching transistor is coupled to an output terminal of the seventh switching transistor and a control terminal of the sixth switching transistor.

An input terminal of the sixth switching transistor is coupled to the low level signal. An output terminal of the sixth switching transistor is coupled to the level signal output terminal.

An input terminal of the seventh switching transistor is coupled to the high level signal. An input terminal of the eighth switching transistor is coupled to the high level signal. An output terminal of the eighth switching transistor is coupled to the level signal output terminal.

The first switching transistor, the second switching transistor, the fifth switching transistor, and the sixth switching transistor are n-channel metal-oxide-semiconductor field-effect transistors. The third switching transistor, the fourth switching transistor, the seventh switching transistor, and the eighth switching transistor are p-channel metal-oxide-semiconductor field-effect transistors.

The specific operational principle of the liquid crystal display device of the present invention is the same as or similar to that described in the liquid crystal display panel of the above-mentioned preferred embodiment. Please refer to the related descriptions in the liquid crystal display panel of the above-mentioned embodiment.

In the liquid crystal display panel and the liquid crystal display device of the present invention, the input voltage signals of the non-inverting terminal and the inverting terminal of the level shifter are determined according to the number of the inverting amplifiers of the output buffer. The manufacture cost of the liquid crystal display panel can be effectively decreased, thereby solving the technical problem that the manufacture costs of the liquid crystal display panel and the liquid crystal display device are high in the prior art.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structures.

What is claimed is:

1. A liquid crystal display panel, comprising:
    drive circuits for providing data signals and scan signals;
    data lines for transmitting the data signals;
    scan lines for transmitting the scan signals; and
    pixel units for using the data signals to display an image under control of the scan signals;
    wherein each of the drive circuits comprises:
    a level shifter for converting an input voltage signal into a high level signal or a low level signal, and the level shifter comprising a non-inverting terminal, an inverting terminal, and a level signal output terminal; and
    an output buffer for amplifying the high level signal or the low level signal, and the output buffer comprising a plurality of inverting amplifiers;
    wherein voltage signals which are inputted to the non-inverting input terminal and the inverting input terminal of the level shifter are determined according to a number of the inverting amplifiers of the output buffer.

2. The liquid crystal display panel of claim 1, wherein when the output buffer comprises an even number of the inverting amplifiers, a non-inverting voltage signal is inputted to the non-inverting input terminal of the level shifter and an inverting voltage signal is inputted to the inverting input terminal of the level shifter.

3. The liquid crystal display panel of claim 2, wherein the inverting voltage signal is generated after the non-inverting voltage signal passes through a NOT gate.

4. The liquid crystal display panel of claim 1, wherein when the output buffer comprises an odd number of the inverting amplifiers, an inverting voltage signal is inputted to the non-inverting input terminal of the level shifter and a non-inverting voltage signal is inputted to the inverting input terminal of the level shifter.

5. The liquid crystal display panel of claim 4, wherein the inverting voltage signal is generated after the non-inverting voltage signal passes through a NOT gate.

6. The liquid crystal display panel of claim 1, wherein the level shifter comprises a first switching transistor, a second switching transistor, a third switching transistor, a fourth switching transistor, a fifth switching transistor, a sixth switching transistor, a seventh switching transistor, and an eighth switching transistor;
  a control terminal of the first switching transistor is coupled to the non-inverting input terminal, an input terminal of the first switching transistor is coupled to the low level signal, and an output terminal of the first switching transistor is coupled to a control terminal of the eighth switching transistor, an output terminal of the third switching transistor, and a control terminal of the fourth switching transistor;
  a control terminal of the second switching transistor is coupled to the inverting input terminal, an input terminal of the second switching transistor is coupled to the low level signal, and an output terminal of the second switching transistor is coupled to a control terminal of the third switching transistor, an output terminal of the fourth switching transistor, and a control terminal of the seventh switching transistor;
  an input terminal of the third switching transistor is coupled to the high level signal, and an input terminal of the fourth switching transistor is coupled to the high level signal;
  an input terminal of the fifth switching transistor is coupled to the low level signal, a control terminal of the fifth switching transistor is coupled to the level signal output terminal, and an output terminal of the fifth switching transistor is coupled to an output terminal of the seventh switching transistor and a control terminal of the sixth switching transistor;
  an input terminal of the sixth switching transistor is coupled to the low level signal, and an output terminal of the sixth switching transistor is coupled to the level signal output terminal;
  an input terminal of the seventh switching transistor is coupled to the high level signal, an input terminal of the eighth switching transistor is coupled to the high level signal, and an output terminal of the eighth switching transistor is coupled to the level signal output terminal.

7. The liquid crystal display panel of claim 6, wherein the first switching transistor, the second switching transistor, the fifth switching transistor, and the sixth switching transistor are n-channel metal-oxide-semiconductor field-effect transistors.

8. The liquid crystal display panel of claim 6, wherein the third switching transistor, the fourth switching transistor, the seventh switching transistor, and the eighth switching transistor are p-channel metal-oxide-semiconductor field-effect transistors.

9. A liquid crystal display device, comprising a backlight source and a liquid crystal display panel, the liquid crystal display panel comprising:
  drive circuits for providing data signals and scan signals;
  data lines for transmitting the data signals;
  scan lines for transmitting the scan signals; and
  pixel units for using the data signals to display an image under control of the scan signals,
  wherein each of the drive circuits comprises:
  a level shifter for converting an input voltage signal into a high level signal or a low level signal, and the level shifter comprising a non-inverting terminal, an inverting terminal, and a level signal output terminal; and
  an output buffer for amplifying the high level signal or the low level signal, and the output buffer comprising a plurality of inverting amplifiers;
  wherein voltage signals which are inputted to the non-inverting input terminal and the inverting input terminal of the level shifter are determined according to a number of the inverting amplifiers of the output buffer.

10. The liquid crystal display device of claim 9, wherein when the output buffer comprises an even number of the inverting amplifiers, a non-inverting voltage signal is inputted to the non-inverting input terminal of the level shifter and an inverting voltage signal is inputted to the inverting input terminal of the level shifter.

11. The liquid crystal display device of claim 10, wherein the inverting voltage signal is generated after the non-inverting voltage signal passes through a NOT gate.

12. The liquid crystal display device of claim 9, wherein when the output buffer comprises an odd number of the inverting amplifiers, an inverting voltage signal is inputted to the non-inverting input terminal of the level shifter and a non-inverting voltage signal is inputted to the inverting input terminal of the level shifter.

13. The liquid crystal display device of claim 12, wherein the inverting voltage signal is generated after the non-inverting voltage signal passes through a NOT gate.

14. The liquid crystal display device of claim 9, wherein the level shifter comprises a first switching transistor, a second switching transistor, a third switching transistor, a fourth switching transistor, a fifth switching transistor, a sixth switching transistor, a seventh switching transistor, and an eighth switching transistor;
  a control terminal of the first switching transistor is coupled to the non-inverting input terminal, an input terminal of the first switching transistor is coupled to the low level signal, and an output terminal of the first switching transistor is coupled to a control terminal of the eighth switching transistor, an output terminal of the third switching transistor, and a control terminal of the fourth switching transistor;
  a control terminal of the second switching transistor is coupled to the inverting input terminal, an input terminal of the second switching transistor is coupled to the low level signal, and an output terminal of the second switching transistor is coupled to a control terminal of the third switching transistor, an output terminal of the fourth switching transistor, and a control terminal of the seventh switching transistor;

an input terminal of the third switching transistor is coupled to the high level signal, and an input terminal of the fourth switching transistor is coupled to the high level signal;

an input terminal of the fifth switching transistor is coupled to the low level signal, a control terminal of the fifth switching transistor is coupled to the level signal output terminal, and an output terminal of the fifth switching transistor is coupled to an output terminal of the seventh switching transistor and a control terminal of the sixth switching transistor;

an input terminal of the sixth switching transistor is coupled to the low level signal, and an output terminal of the sixth switching transistor is coupled to the level signal output terminal;

an input terminal of the seventh switching transistor is coupled to the high level signal, an input terminal of the eighth switching transistor is coupled to the high level signal, and an output terminal of the eighth switching transistor is coupled to the level signal output terminal.

15. The liquid crystal display device of claim 14, wherein the first switching transistor, the second switching transistor, the fifth switching transistor, and the sixth switching transistor are n-channel metal-oxide-semiconductor field-effect transistors.

16. The liquid crystal display device of claim 14, wherein the third switching transistor, the fourth switching transistor, the seventh switching transistor, and the eighth switching transistor are p-channel metal-oxide-semiconductor field-effect transistors.

* * * * *